United States Patent
Berthezene et al.

(10) Patent No.: US 8,814,354 B2
(45) Date of Patent: Aug. 26, 2014

(54) PROCESS FOR DESIGNING AN OPHTHALMIC PROGRESSIVE EYEGLASS

(75) Inventors: Marie-Anne Berthezene, Charenton-le-Pont (FR); Bernard Bourdoncle, Charenton-le-Pont (FR); Laurent Calixte, Charenton-le-Pont (FR); Cyril Guilloux, Charenton-le-Pont (FR); Jérôme Moine, Charenton-le-Pont (FR); Soazic Mousset, Charenton-le-Pont (FR); Damien Paille, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 47 days.

(21) Appl. No.: 13/522,904

(22) PCT Filed: Dec. 24, 2010

(86) PCT No.: PCT/EP2010/070722
§ 371 (c)(1), (2), (4) Date: Jul. 18, 2012

(87) PCT Pub. No.: WO2011/085936
PCT Pub. Date: Jul. 21, 2011

(65) Prior Publication Data
US 2012/0300172 A1    Nov. 29, 2012

(30) Foreign Application Priority Data
Jan. 18, 2010   (EP) ..................................... 10305052

(51) Int. Cl.
G02C 7/02    (2006.01)

(52) U.S. Cl.
USPC ............ 351/159.76; 351/159.73; 351/159.74; 351/159.75; 351/159.77

(58) Field of Classification Search
USPC ............... 351/159.07, 159.13, 159.2, 159.21, 351/159.22, 159.52–159.54, 159.7, 159.71, 351/159.72, 159.76, 159.77, 241
See application file for complete search history.

(56) References Cited

U.S. PATENT DOCUMENTS

| | | | |
|---|---|---|---|
| 3,623,800 A * | 11/1971 | Volk | ........................ 351/159.21 |
| 6,139,148 A | 10/2000 | Menezes | |
| 6,149,271 A | 11/2000 | Menezes et al. | |
| 6,595,638 B2 | 7/2003 | Ahsbahs et al. | |

(Continued)

FOREIGN PATENT DOCUMENTS

| | | |
|---|---|---|
| EP | 1 063 556 | 12/2000 |
| WO | WO 00/55678 | 9/2000 |

(Continued)

Primary Examiner — Scott J Sugarman
Assistant Examiner — William Alexander
(74) Attorney, Agent, or Firm — Cozen O'Connor

(57) ABSTRACT

A process for designing an ophthalmic progressive eyeglass comprises providing an initial front surface and an initial back surface. Respective addition values of front and back surfaces of the eyeglass are varied based on said initial front and back surfaces using a surface derivation tool. These surface addition values are selected so that the eyeglass exhibits an eyeglass addition value which matches a wearer's prescription and a value for a design feature which matches a target value. Said target value may be used for customizing the ophthalmic progressive eyeglass. The process does not require point-to-point surface optimization.

10 Claims, 17 Drawing Sheets

(56) References Cited

U.S. PATENT DOCUMENTS

| | | |
|---|---|---|
| 6,786,600 B2 | 9/2004 | Katzman et al. |
| 6,955,433 B1 | 10/2005 | Wooley et al. |
| 7,150,527 B2 * | 12/2006 | Meron et al. ............ 351/159.42 |
| 7,207,674 B2 | 4/2007 | Bourdoncle et al. |
| 7,207,675 B1 | 4/2007 | Chauveau et al. |
| 7,210,779 B2 | 5/2007 | Esser et al. |
| 7,210,780 B1 | 5/2007 | Bourdoncle et al. |
| 7,413,303 B2 | 8/2008 | Guilloux et al. |
| 7,427,134 B2 | 9/2008 | Bourdoncle et al. |
| 7,540,610 B2 | 6/2009 | Carimalo et al. |
| 8,142,017 B2 | 3/2012 | Drobe et al. |
| 2005/0052615 A1 * | 3/2005 | Wang et al. .................. 351/168 |
| 2005/0254007 A1 * | 11/2005 | Wang et al. .................. 351/177 |

FOREIGN PATENT DOCUMENTS

| | | |
|---|---|---|
| WO | WO 01/35156 | 5/2001 |
| WO | WO 2007/004070 | 1/2007 |
| WO | WO 2007/004071 | 1/2007 |

* cited by examiner

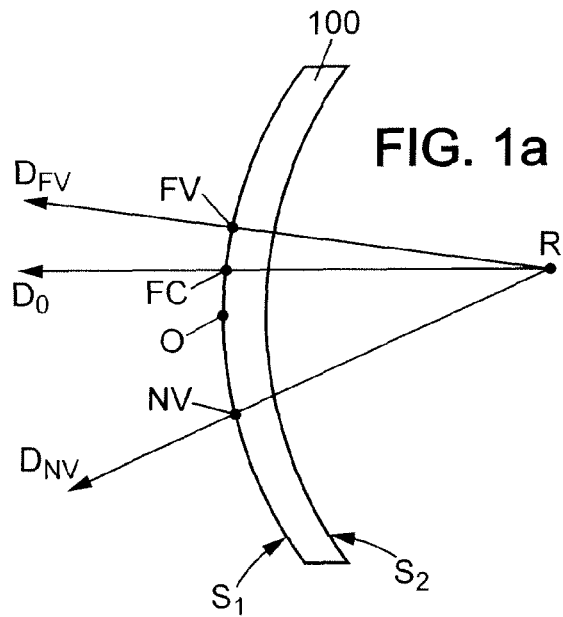
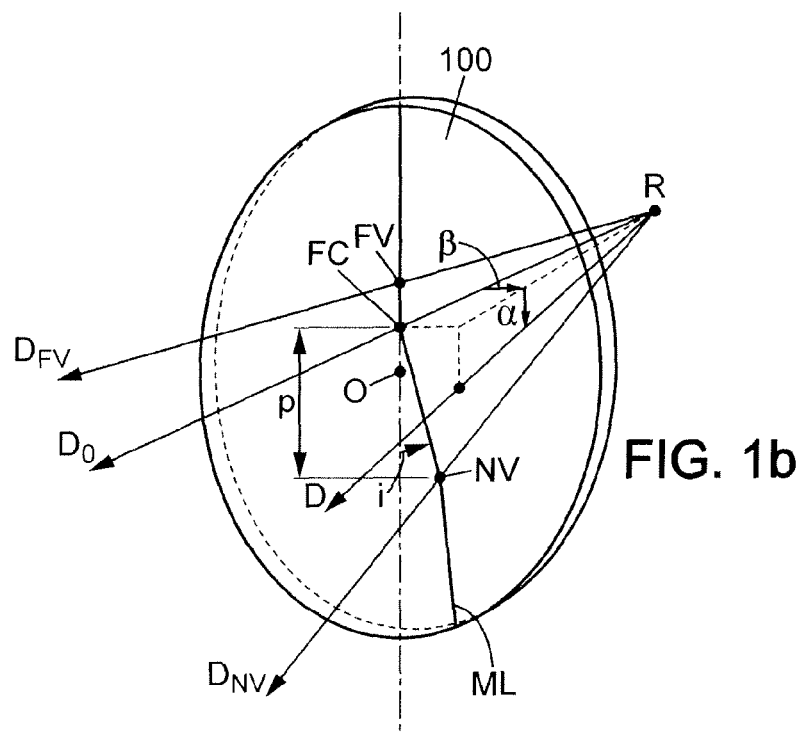

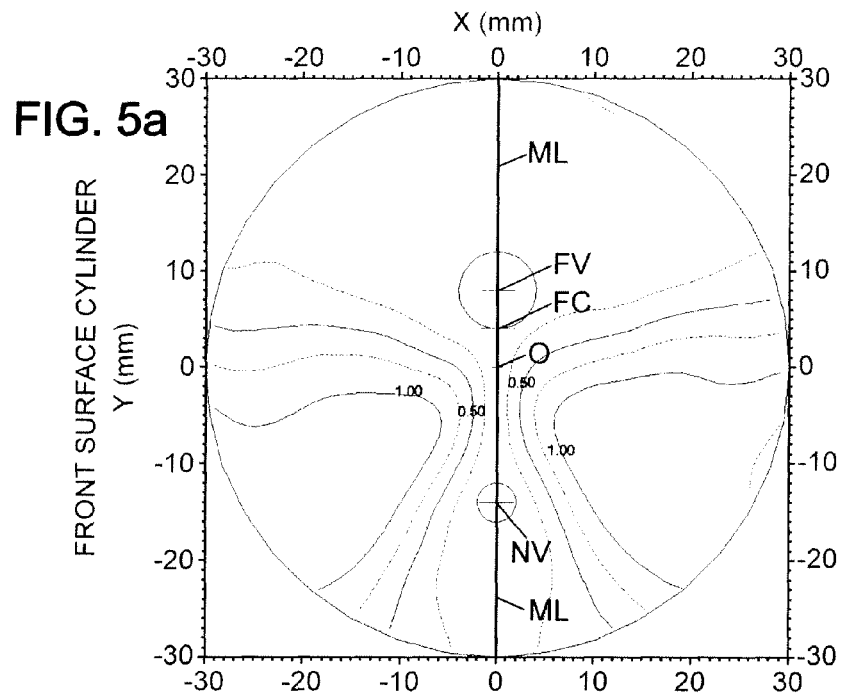
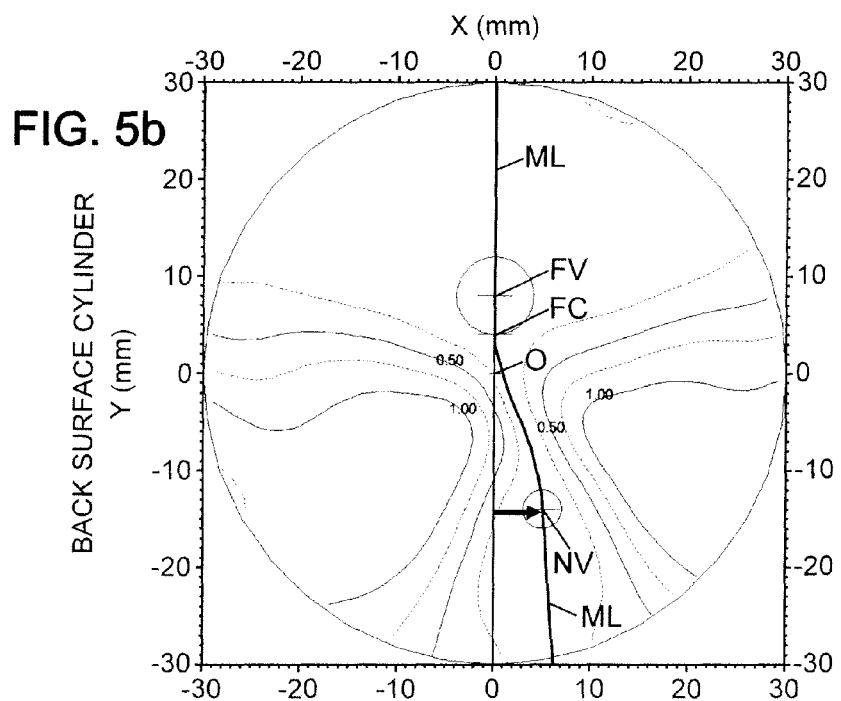

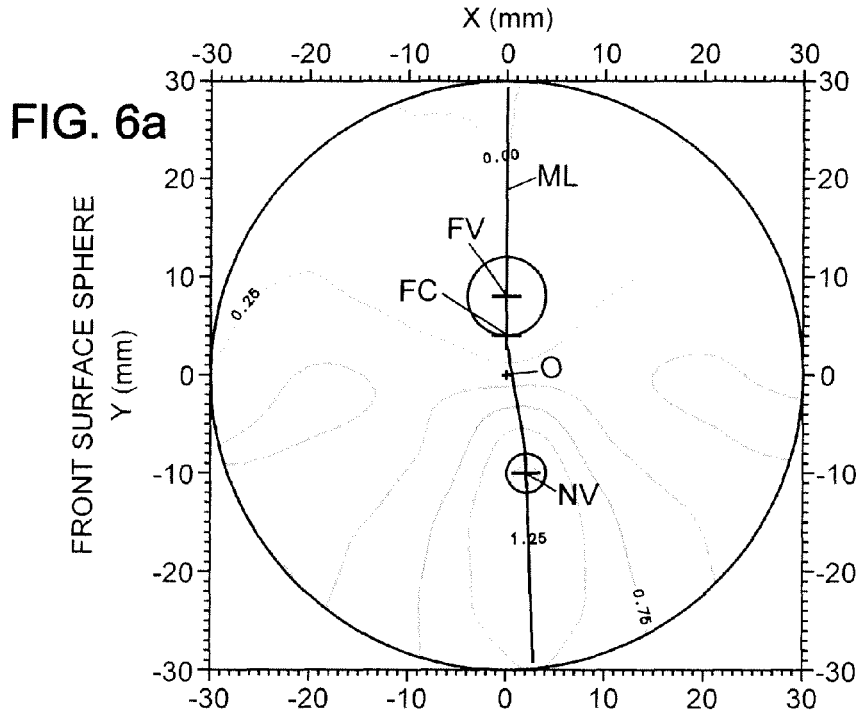
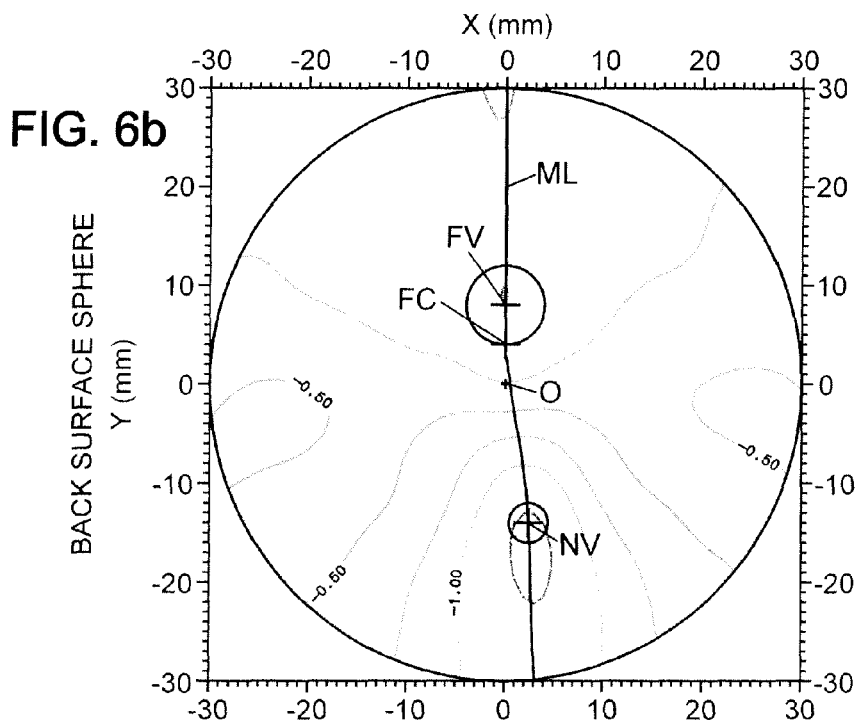

PROCESS FOR DESIGNING AN OPHTHALMIC PROGRESSIVE EYEGLASS

RELATED APPLICATIONS

This is a U.S. National Phase Application under 35 USC 371 of International Application PCT/EP2010/070722 filed on Dec. 24, 2010.

This application claims the priority of European application no. 10305052.2 filed Jan. 18, 2010 the entire content of which is hereby incorporated by reference.

FIELD OF THE INVENTION

The present invention relates to a process for designing an ophthalmic progressive eyeglass.

BACKGROUND OF THE INVENTION

Designing an ophthalmic progressive eyeglass by providing two progressive surfaces respectively on the two faces of the eyeglass is already known. In particular, using a progressive surface on either face of the eyeglass makes it possible to reduce the total amount of unwanted astigmatism of the eyeglass. To this purpose, both progressive surfaces are to be selected appropriately based on the locations and the directions of the unwanted astigmatism amounts which are produced respectively by the two surfaces.

Within the context of the present invention, a progressive eyeglass surface generally denotes a continuous surface which exhibits a variation in sphere between a far vision point and a near vision point pertaining to this surface. Then the addition is the difference in the sphere values between the far vision point and the near vision point. It is positive for an actually progressive surface, and negative for a regressive surface. In this specification, the phrase progressive surface is used for indicating both an actually progressive surface and a regressive surface, with the addition value being positive in the first case and negative in the second case.

Defining both progressive surfaces which are intended respectively for the front face and the back face of the ophthalmic eyeglass is a difficult task. It can be performed by optimizing each surface with point-to-point computation sequences, combined with calculating the value of a merit function. But such computation method is difficult to implement. It requires computation skill from the operator, complex computation means to be used and computation time. However such resources are not always available at the laboratory or at the retailer's office where the eyeglass is to be manufactured. As a consequence, it may not be possible to provide a progressive eyeglass wearer with the comfort improvements possible by implementing two progressive surfaces, one on either face of the eyeglass.

More precisely, surface optimization is an iterative computational process which involves target values for fixed features, at least one test surface, sequence for calculating values for the fixed features using the test surface, an algorithm for modifying the test surface and the merit function. The merit function enables to calculate a difference between the feature values for the test surface and the target values. This difference is reduced progressively by modifying the test surface at each iteration. The result of the optimization process is a new surface corresponding to a minimum in the values of the merit function. Although such process is called surface optimization, it is most often implemented with optical features. Such optical features may be optical power and unwanted astigmatism values for varying vision directions through an eyeglass, or other optical features which are derived from the optical power and unwanted astigmatism values. Anyway, the eyeglass optimization process implements again two-dimensional adjustments of the test eyeglass, so that the complexity of the process is unchanged. Because of this reason, such eyeglass optimization is usually called again surface optimization.

Surface optimization is different from surface derivation, this latter process being described in particular in U.S. Pat. No. 6,955,433. Basically, a surface derivation process consists in calculating surface coordinates from a distribution of sphere and cylinder values provided for this surface. Such calculation is a two-dimensional double integration process. Theoretically, a first integration step performed from the sphere and cylinder values leads to slope values of the surface, and a second integration step performed from the slope values leads to the surface sag values. Practically, both integration steps may be merged within a single computational step.

Therefore derivation of a final surface from an initial surface is comprised of three steps:

/i/ calculating sphere and cylinder distributions for the initial surface; then

/ii/ transforming the sphere and cylinder distributions; then

/iiiV performing the two-dimensional double integration process from the sphere and cylinder distributions transformed, so as to obtain the final surface.

In a known manner, such surface derivation process may be implemented with any transformation type for the sphere and cylinder distributions used in step /ii/. One can cite the following transformations in particular:

- any scaling operation applied to one or both base coordinates of the sag values of the initial surface;
- any linear transformation applied to the sphere and cylinder values of the initial surface, including addition of a constant sphere value, so-called base value modification;
- any spatially-limited modification of the sphere and cylinder values of the initial surface, including a change in the sphere values limited to a field around a near vision point, and resulting in addition value modification; and
- any combination of the respective sphere and cylinder distributions of at least two initial surfaces, resulting into a new sphere and cylinder distribution which is assigned to the final surface.

SUMMARY OF THE INVENTION

Therefore, a first object of the present invention is to make it easier to provide an ophthalmic eyeglass to a wearer, with progressive surfaces on both faces of this eyeglass. In particular, the first object consists in providing a method for designing the eyeglass with two progressive surfaces without implementing heavy calculations.

A second object of the invention consists in designing a progressive eyeglass so that a design parameter of the eyeglass can be adjusted, further to the ophthalmic prescription parameters.

To this end, one aspect of the present invention provides a process for designing an ophthalmic progressive eyeglass, which process comprises the following steps:

/1/ providing an ophthalmic prescription for a wearer of the eyeglass, comprising prescribed values respectively of a far vision optical power, an astigmatism correction and an addition;

121 providing a target value for at least one optical design feature of the eyeglass to be manufactured;

/3/ providing at least one initial eyeglass front surface, with an initial first addition value and a first value for a surface design feature connected to the optical design feature;

141 providing at least one initial eyeglass back surface, with an initial second addition value and a second value for the surface design feature, the first and second values of the surface design feature being different from one another when the initial front and back surfaces are provided with one and same addition value by surface derivation;

/5/ computer-simulating the eyeglass using:
- a final front surface which is derived from the initial front surface for changing the initial first addition value into a final first addition value for the final front surface;
- a final back surface which is derived from the initial back surface for changing the initial second addition value into a final second addition value for the final back surface; and
- a transparent medium which is intermediate between the final front and back surfaces.

At least one of the final front and back surfaces is further combined with a spherical or toric surface so that the computer-simulated eyeglass exhibits the prescribed values of the far vision optical power and the astigmatism correction.

According to an embodiment of the invention, the final first and second addition values are selected so that the eyeglass exhibits substantially the prescribed addition value and the target value for the optical design feature. Thus, the value of the optical design feature is made close to the target value by distributing the total addition of the eyeglass into a first addition contribution produced by the eyeglass front face and a second addition contribution produced by the eyeglass back face. The total addition value thus matches the prescribed addition value at the same time as the optical design feature matches the target value.

An embodiment of the invention only uses a variable distribution of the total addition of the eyeglass between both faces of the eyeglass, and does not implement any point-to-point surface optimization. Therefore, it is easy to implement and does not involve time-consuming computations. In particular, it can be implemented on demand directly upon manufacturing the eyeglass intended for a wearer.

In particular, the process according to an embodiment of the invention only requires providing two initial surfaces, respectively front and back eyeglass surfaces, and means for deriving the final surfaces from the initial surfaces by varying the addition values of these latter. Such surface derivation tool, which is suitable for varying the addition value of a surface without performing any point-to-point surface optimization, is well known and currently available. It does not require high capacity computation means and can be used by an eyeglass retailer or a laboratory operator for each wearer.

Optionally, either the final front surface or the final back surface or both may be derived from the initial front surface or the initial back surface, respectively, by further changing a respective initial base curve value of this initial front or back surface into a respective final base curve value for the final front or back surface. Such change of the base curve value may be performed using the same surface derivation tool as for performing the changes of the surface addition values of the front and back surfaces.

The optical design feature which is adjusted by the invention may be any feature relating to the optical power and astigmatism distributions. It may be selected among a lateral offset of a near vision direction of the eyeglass with respect to a far vision direction, so-called inset value, a width of a near vision field of the eyeglass, a width of a far vision field of the eyeglass, a width of an intermediate vision field of the eyeglass, said field widths being expressed in terms of optical power variations, astigmatism variations or unwanted astigmatism variations for fixed vision height, a total progression length of the eyeglass, a partial progression length of the eyeglass defined by a fixed proportion of optical power increase to the prescribed addition value, an optical power value for fixed vision direction, a value for astigmatism or unwanted astigmatism value for fixed vision direction, an optical power gradient value for fixed vision direction, a gradient value for astigmatism or unwanted astigmatism for fixed vision direction, said gradient values possibly referring to points pertaining to a meridian line of the eyeglass, a maximum value for unwanted astigmatism over the whole eyeglass or over an eyeglass part limited to one side of a meridian line of the eyeglass, a maximum gradient value for optical power or astigmatism or unwanted astigmatism over the whole eyeglass or over an eyeglass part limited to one side of the meridian line of the eyeglass, a maximum gradient value for optical power along the meridian line of the eyeglass, or any combination of two or more of the previous features. Basically, the values for far vision optical power, astigmatism and addition are excluded from the optical design features, because they pertain to the wearer's prescription. Put another way, an optical design feature may be any eyeglass feature not included in the wearer's prescription, but which can vary between two eyeglasses both corresponding to one and same wearer's prescription. In addition, because the initial front and back surfaces are provided initially to the eyeglass retailer or the laboratory operator, the process of the invention automatically leads to a balance between several design features concerned in the initial surfaces.

In preferred embodiments of the invention, the target value for the optical design feature may be determined by means of a measurement performed on the eyeglass wearer. In particular, the target value may result from a measurement of head and eye movements executed by the wearer when changing sight direction. Therefore, the invention makes it possible to supply the wearer with an eyeglass which is customized as a function of a customizing optical feature, by distributing the eyeglass addition between both eyeglass faces.

Step /5/ of the invention process may be performed using various implementations. For example, a distribution of the addition between the front and back surfaces of the eyeglass may be directly obtained by optimization, for the eyeglass to exhibit a value for the optical design which is close to the target value. Such optimization process operates only by varying the respective addition values of the front and back surfaces, or a distribution ratio of the eyeglass total addition between these front and back surfaces, but it does not involve point-to-point surface optimization carried out over a sampling array in the eyeglass surfaces.

Another implementation may consist in first calculating the values of the optical design feature respectively for two reference eyeglasses, with all the prescribed addition assigned to only one of the front and back surfaces. Then the final addition values of the final front and back surfaces may be interpolation-calculated based on these reference eyeglasses.

Still another implementation may start with converting the optical design feature into a surface design feature which relates to each one of the front surface and back surface. The target value of the optical design feature is thus converted into a corresponding converted target value for the surface design feature. Then, the final distribution of the prescribed addition may be interpolation-calculated based on the converted target value together with the first and second values of the surface design feature, respectively for the initial front and back surfaces.

A process according to the invention may be completed with the following additional step:

16/machining the eyeglass in accordance with the eyeglass which has been computer-simulated in step 151.

One will understand that, as of general concern in ophthalmics, the optimized or calculated values are made close to the target or prescribed values, but they may be different from these latter to some extent compatible with the ophthalmic application. In particular, the total addition value of the eyeglass designed using the present invention is close to the prescribed value, however it may be different from this latter of less than 0.25 diopter. The same reasoning applies to the value of the optical design feature for the final eyeglass. One will understand that the invention reduces the difference between the actual values and the prescribed and target values, for the final eyeglass compared with an initial eyeglass comprised of the initial front and back surfaces.

When the final eyeglass is to be machined from a semi-finished eyeglass, at least one of the final first and second addition values may be selected according to the invention, further so that the corresponding final front or back surface pertains to a semi-finished eyeglass available.

BRIEF DESCRIPTION OF THE DRAWINGS

Other improvements and advantages of the present invention will appear from the detailed description hereafter of several implementations, in connection with the following drawings:

FIGS. 1a and 1b are respectively a cross-sectional and a perspective view of an eyeglass to which the present invention may be applied;

FIGS. 5a and 5b are cylinder maps respectively for a final eyeglass front surface and a final eyeglass back surface.

FIGS. 6a and 6b are sphere maps respectively for a final eyeglass front surface and a final eyeglass back surface.

DETAILED DESCRIPTION OF THE DRAWINGS

Figure 2:
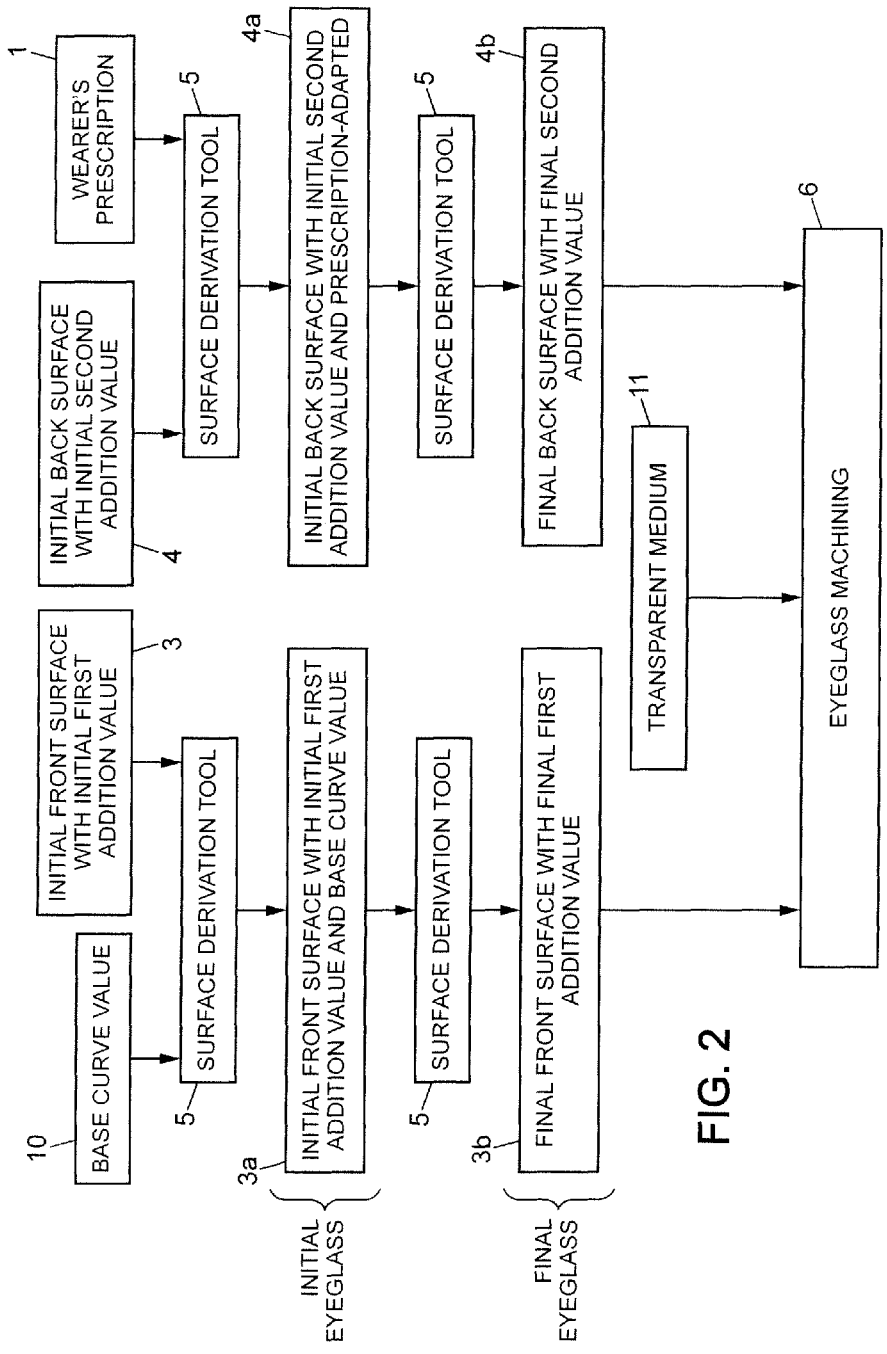
FIG. 2 is a general block diagram of a process according to an embodiment of the present invention.

For clarity sake, FIGS. 1a and 1b are not drawn with actual dimensions or actual dimension ratios. In addition, identical reference signs which are used in different figures denote identical elements of elements with identical functions.

Referring to FIGS. 1a and 1b, an eyeglass 100 is comprised of a portion of transparent material limited between a front surface and a back surface $S_2$. Front and back surfaces Si and $S_2$ are so-called in connection with the use position of the eyeglass 100 when assembled into a spectacle frame and adapted on the face of a wearer. In this situation of the eyeglass 100 worn by the wearer, R denotes the rotation center of the eyeball (not represented) behind the eyeglass. Thus, any vision direction D corresponding to a rotational position of the eyeball originates from the rotation center R. As usual for ophthalmic eyeglasses, a fitting cross FC is indicated on the front surface Si, and the eyeglass 100 is to be fitted into the spectacle frame so that the main horizontal vision direction, denoted $D_0$, intersects the surface Si at FC when the wearer's head is in primary position. Usually, the rotation center R is 25.5 mm (millimeter) behind the back surface $S_2$ along the main horizontal direction $D_0$. Based on this use position of the eyeglass 100, the vision direction D is provided with two angle coordinates a and β. The angle coordinate a is measured in a vertical plane containing the direction D, from a reference horizontal plane which contains the main horizontal vision direction $D_0$. The other angle coordinate β is measured within the reference horizontal plane, between a reference vertical plane which contains the direction Do and the vertical plane which contains the vision direction D. In addition, a is assigned with a positive or negative value when the vision direction D is pointing below or above the reference horizontal plane, respectively. The sign of the β-value is positive or negative when the vision direction D is pointing towards or away the wearer's nose, respectively. All the parameters which are not recited here and relate to the use position of the eyeglass 100 fitted on the wearer's face are well-known, and values of these parameters are listed in the ophthalmic standards.

When the eyeglass 100 is of progressive addition type, DFV and DNV denote respectively a far vision direction and a near vision direction. The far vision direction $D_{FV}$ is dedicated for the wearer to look at objects located at long distance away from him. The near vision direction $D_{NV}$ is dedicated for the wearer to look at objects at close distance, for example in order to read a book laid on a table in front of him. Typically, near vision distance is 40 cm (centimeter) and far vision distance is longer than 2 m (meter). The vision directions $DF_V$ and $D_{NV}$ intersect the front surface Si respectively at points FV and NV, which are the control points of the progressive eyeglass where the ophthalmic lens powers have to be checked. The far vision direction $D_{FV}$ is contained in the reference vertical plane which also contains the main horizontal vision direction $D_0$. But the near vision direction $D_N$v is angularly offset towards the wearer's nose with respect from the reference vertical plane. The β-value for $D_N$v is denoted i and called inset.

A meridian line ML is drawn on the front surface Si, which contains the points FV, FC and NV, listed from top to bottom of the eyeglass 100. This meridian line ML is thus shifted towards the wearer's nose below the fitting cross FC, in accordance with the inset value i which is always positive.

The progression length p is the distance between the fitting cross FC and the near vision point NV, in projection on the vertical line passing through FC and FV.

In a manner commonly known in ophthalmics, the optical power distribution and the unwanted astigmatism distribution of a progressive eyeglass may be displayed in respective maps, so-called optical power map and astigmatism map. The angle coordinates a and β are used for the axes of these optical maps.

Also in a manner commonly known in ophthalmics, the curvature parameters of an eyeglass surface may be displayed in two surface maps so-called sphere map and cylinder map. The axis coordinates of these surface maps are linear distances in a plane tangent to the eyeglass surface, with point-contact at a surface center O. This surface center O corresponds to the prism reference point of the eyeglass 100, and is also denoted PRP. For the examples contained in this specification, it is located at 4 mm below the fitting cross FC. The distance coordinates are denoted x and y, and are measured respectively parallel and perpendicular to the reference horizontal plane, from the surface center O. For a progressive eyeglass, at least one of the front and back surfaces is a complex surface, i.e. with curvature values which vary continuously between points which are apart from one another in the surface. The sphere value is the average of two curvatures at one and same point in the surface, along two directions perpendicular to each other and tangent to the surface at the point of concern. The cylinder value is the absolute difference between the two curvatures. Actually, when n denotes the refractive index of the transparent material which constitutes the lens, the average curvature and the curvature difference are further multiplied by n−1 or 1−n respectively for the front surface or the back surface, for obtaining the sphere value and the cylinder value of this surface. For the mathematical formulae of the sphere and cylinder values, one may refer to U.S. Pat. No. 6,595,638 or FR 2 871 247 for example.

In the following examples, the far vision point FV is about 4 mm above the fitting cross FC, i.e. along the y-coordinate direction. The near vision point NV may be about 18 mm below the fitting cross FC in some of these examples.

Then, it is obvious that an optical design feature of the eyeglass 100 is connected to a corresponding surface design feature of the surfaces Si and $S_2$. In particular, a 2 degree angular deviation for the vision direction D corresponds substantially to a 1 mm shift in the surfaces Si and $S_2$.

Turning now to the reference numbers in FIG. 2, a process according to the invention starts with the provision of the following initial data:

1: the ophthalmic wearer's prescription, including a prescribed optical power value for the far vision, a prescribed astigmatism value and a prescribed addition value;

2: a target value for an optical design feature (see FIGS. 3 and 4), with invention examples described later in this specification for three different optical design features;

3: an initial front surface with initial values for a front surface addition and a surface design feature, respectively denoted initial first addition value and initial first value; and 4: an initial back surface with initial values for a back surface addition and the surface design feature, respectively denoted initial second addition value and initial second value.

Optionally, another initial datum may be the base curve value 10 of the eyeglass 100. As commonly known, the base curve value is the curvature of the front surface Si at the far vision point FV. But such base curve value is actually determined from the prescribed value of the optical power for the far vision direction.

The initial front and back surfaces may be read from data files stored on a computer-readable medium, and available to the operator implementing the process of the invention. For example, each surface may be recorded as sag values respectively associated to sampling points identified with the x and y distance coordinates.

The operator is also provided with a surface derivation tool labelled 5, which is suitable for modifying an initial surface so as to change one or several of the following surface parameters: the sphere value at the intersection of the far vision direction DFV with this surface, the cylinder value at the same point, and the addition value of the initial surface. Such surface derivation tool is well known in ophthalmics and is described for example in document U.S. Pat. No. 6,955,433.

Such surface derivation tool 5 is computer-implemented and derives a final surface from the initial surface by modifying one of the above-listed surface parameters. When defining the front and the back surfaces and when using the surface derivation tool, the surfaces handled may have negative values for the addition, corresponding then to regressive surfaces.

Then the surface derivation tool 5 is operated starting with each one of the initial front surface 3 and the initial back surface 4, so as to obtain a final front surface and a final back surface, respectively. This may be performed in a multiple step-process.

First, the initial front surface 3 may be changed by implementing the surface derivation tool 5 for obtaining the desired base curve value 10. The new initial front surface thus obtained is denoted 3a.

Second, the initial back surface 4 may be changed by implementing the surface derivation tool 5, for obtaining the prescribed values for the optical power and the astigmatism correction when the initial back surface is optically combined with the initial front surface 3a and further combined with an intermediate transparent medium 11. The new initial back surface thus obtained is denoted 4a.

But other rules for adapting the curvatures of the initial front and back surfaces so as to produce the prescribed values for the optical power and the astigmatism correction may be used alternatively.

The eyeglass formed by the intermediate transparent medium 11, the initial front surface 3a and the initial back surface 4a is so-called initial eyeglass. It produces an optical power for the far vision direction DFV and an astigmatism correction which match the wearer's prescription.

Then, the respective addition values of the front and back surfaces of the eyeglass are used as varying parameters implemented by the surface derivation tool 5, starting from the initial eyeglass. The front and back surface addition values are varied so that the eyeglass produces substantially both the prescribed addition value and the target value for the optical design feature. More specifically, the prescribed addition value is distributed between the front surface and the back surface, with a distribution ratio which modulates the value of the optical design feature. Then, selecting appropriately the addition distribution ratio leads to designing an eyeglass which exhibits substantially the target value for the optical design feature.

A necessary condition for the invention is that the first and second values of the surface design feature, respectively for the initial front and back surfaces, are different from each other when these surfaces are provided with one and same addition value by surface derivation. This ensures that the value of the optical design feature for the eyeglass actually varies as a function of the addition distribution ratio.

Three alternative methods for selecting appropriately the final first and second addition values, or the addition distribution ratio, are now described.

The computer-simulated eyeglass, also denoted final eyeglass, is formed by a so-called final front surface 3b, a so-called final back surface 4b and the transparent medium 11. Most often, the transparent medium 11 is homogeneous and characterized by a uniform refractive index value, for example 1.56. The final front surface 3b is derived from the initial front surface 3a using the surface derivation tool 5, so as to provide this final front surface with a final first addition value. Similarly, the final back surface 4b is derived from the initial back surface 4a using the surface derivation tool 5 again, so as to provide this final back surface with a final second addition value. The final addition distribution ratio is $Raddfj_{na}i = Amnai / A_{pr}esc$, where $Aif_{na}i$ is the final first addition value of the final front surface 3b and $A_{pre}$sc is the addition value prescribed to the wearer. Also, the prescribed addition value may be roughly identified with the difference of the addition values of the eyeglass front and back surfaces: $A_{pre}sc = A\hat{}nai - A_2finai$, with $A_2finai$ denoting the final second addition value of the final back surface 4b. In this formula of the prescribed addition value, the minus sign is due to the 1−n multiplying factor in the sphere value for the back surface. The actual connection between the eyeglass addition value and the final first and second addition values can only be obtained through optical computations, for example by ray tracing.

According to the first method, the final first addition value $A1final$ and the final second addition value $A2f_{fna}i$ are selected by using an optimization process, so that the final eyeglass exhibits substantially the prescribed addition value Apresc and the target value for the optical design feature. Such optimization process uses the first and second addition values of the eyeglass front and back surfaces respectively, as optimization parameters. As known in the art, a merit function is to be used, which varies monotonously with both the difference between the prescribed addition value and the eyeglass addition value, and the difference between the target value and the eyeglass value of the optical design feature. The addition value and the optical design feature value of the eyeglass are computed using a standard optical calculation tool. Such optimization process is different from a point-to-point surface optimization, in so far that each surface is varied as a whole by adjusting the corresponding addition value, but each point of the surface is not adjusted separately. Thus, the optimization process which is used in this first method is simple and rapid to implement, and does not require complex computation means.

The second and third methods do not implement any optimization, but consist each in a direct calculation of the final first addition value $A_1i_{na}i$ and the final second addition value $A_2fi_{na}i$—Optionally, one of both of these values may be further varied by using the surface derivation tool for obtaining a better match of the final eyeglass with the prescribed addition value and the target value of the optical design feature.

The second method consists in calculating the final addition distribution ratio from the respective values of the optical design feature for two reference eyeglasses. It comprises the following substeps:

/5-1a/ computer-simulating a first reference eyeglass using:
  a first front surface which is derived from the initial front surface 3a by changing the initial first addition value into the prescribed addition value;
  a first back surface which is derived from the initial back surface 4a by changing the initial second addition value into zero addition value; and
  the transparent medium 11 intermediate between the first front and back surfaces;

/5-2a/ combining at least one of the first front and back surfaces with a spherical or toric surface so that the computer-simulated first reference eyeglass exhibits the prescribed values of the far vision optical power and the astigmatism correction, and calculating a first reference value of the optical design feature for the first reference eyeglass;

/5-3a/ computer-simulating a second reference eyeglass using:
  a second front surface which is derived from the initial front surface 3a by changing the initial first addition value into zero addition value;
  a second back surface which is derived from the initial back surface 4a by changing the initial second addition value into the opposite of the prescribed addition value; and
  the transparent medium 11 intermediate between the second front and back surfaces;

/5-4a/ combining at least one of the second front and back surfaces with a spherical or toric surface so that the computer-simulated second reference eyeglass exhibits the prescribed values of the far vision optical power and the astigmatism correction, and calculating a second reference value of the optical design feature for the second reference eyeglass;

/5-5a/ based on the first and second reference eyeglasses, determining a virtual linear relationship for variations of the optical design feature as a function of a distribution ratio of a total addition value of the front and back surfaces;

/5-6a/ calculating the distribution ratio of the prescribed addition value between the final front surface 3b and the final back surface 4b by inputting the target value into the virtual linear relation of substep 15-5a/; and 15-7 al calculating the final first and second addition values from the distribution ratio obtained in substep /5-6a/ and the prescribed addition value.

Figure 3:
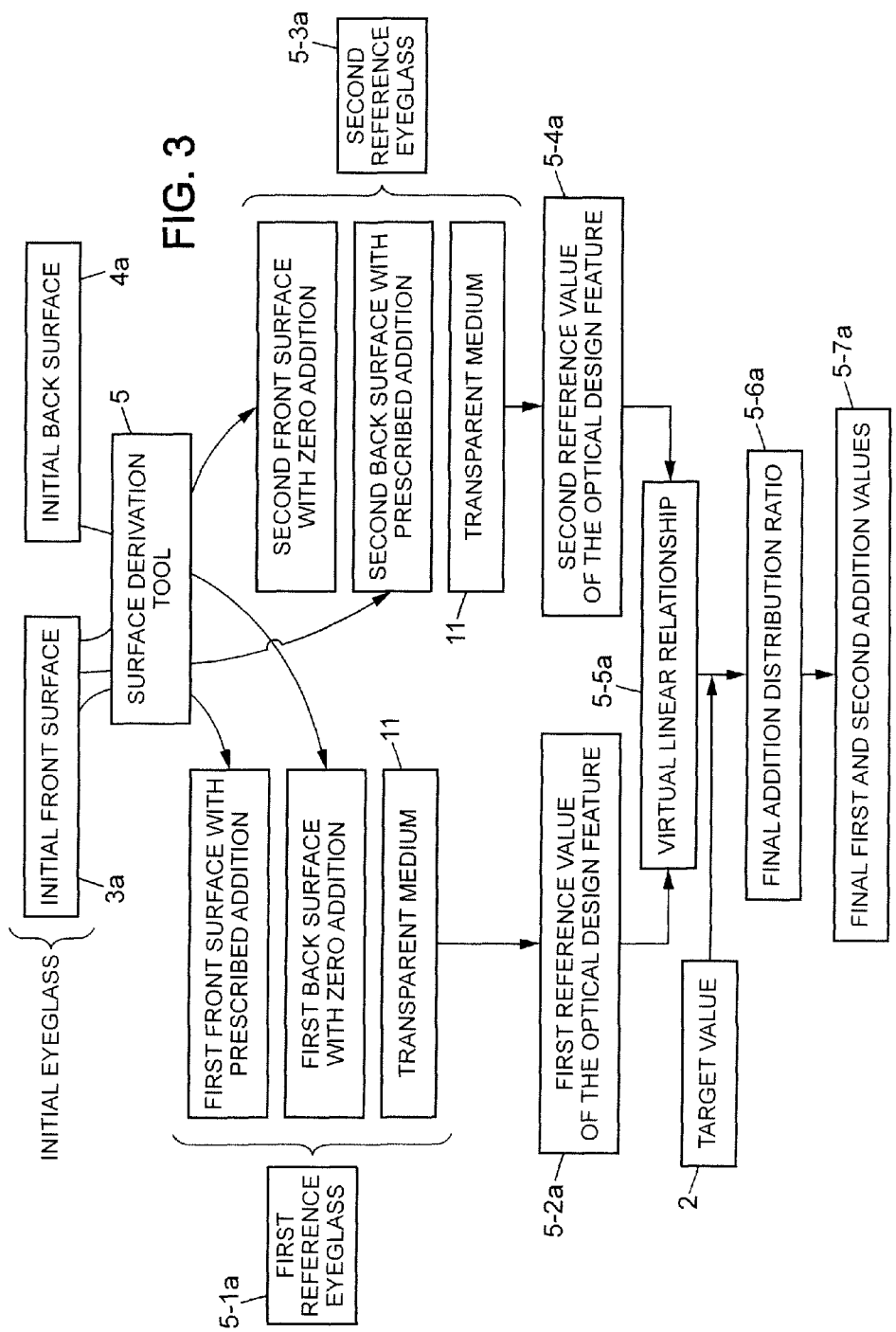
FIGS. 3 and 4 are respective block diagrams of two alternative possible implementations of the invention.

FIG. 3 illustrates these substeps using their respective labels as reference signs.

The virtual linear relationship determined in substep /5-5a/ and implemented in substep /5-6a/ may be:

$$Radd_{f,na,} \sim QD2ref/QDtarget \qquad (1)$$

where $OD_{ta}$rget is the target value for the optical design feature, and $OD_{1,re}f$, resp. $OD_{2,r}ef$, is the first reference value calculated in substep /5-2a/, resp. second reference value of substep /5-4a/. Once the addition distribution ratio is thus obtained, the final first and second addition values may be calculated from the additional formulae:

$$A\text{-}ifinal = Raddfinal \times A_{presc} \text{ and } A_{2f}inai = (Radd_{fi}nai - 1) \times A_{pre}sc \qquad (2)$$

The third method consists in calculating the final addition distribution ratio from the surface design value of two reference eyeglasses. To this end, the target value of the optical design feature is first converted into a converted target value of a surface design feature that corresponds to the optical design feature. The selection of the appropriate surface design feature is based on general knowledge in ophthalmics. In particular, an optical design feature implementing an angle coordinate value is associated with a surface design feature with a distance coordinate value proportional to the angle coordinate value. Based on the standard use condition of the eyeglass 100, a distance coordinate value in millimeters is about half of an angle coordinate value in degrees. Also a contribution of an eyeglass surface to the eyeglass optical power value in diopters is substantially equal to a sphere value at the location in this surface where the light beam impinges. Similarly, a contribution of an eyeglass surface to the astigmatism value of the eyeglass is equal to a cylinder value of this surface at the same location.

The third method comprises the following substeps:

/5-b/ converting the target value for the optical design feature into a converted target value for the surface design feature;

/5-2b/ based on the initial front and back surfaces 3 and 4, determining a virtual linear relationship for variations of the surface design feature as a function of a distribution ratio of a total addition value of the front and back surfaces;

/5-3b/ calculating the distribution ratio of the prescribed addition value between the final front and back surfaces by inputting the converted target value into the virtual linear relation of substep /5-2b/; and /5-4b/ calculating the final first and second addition values from the distribution ratio obtained in substep /5-3b/ and the prescribed addition value.

Figure 4:
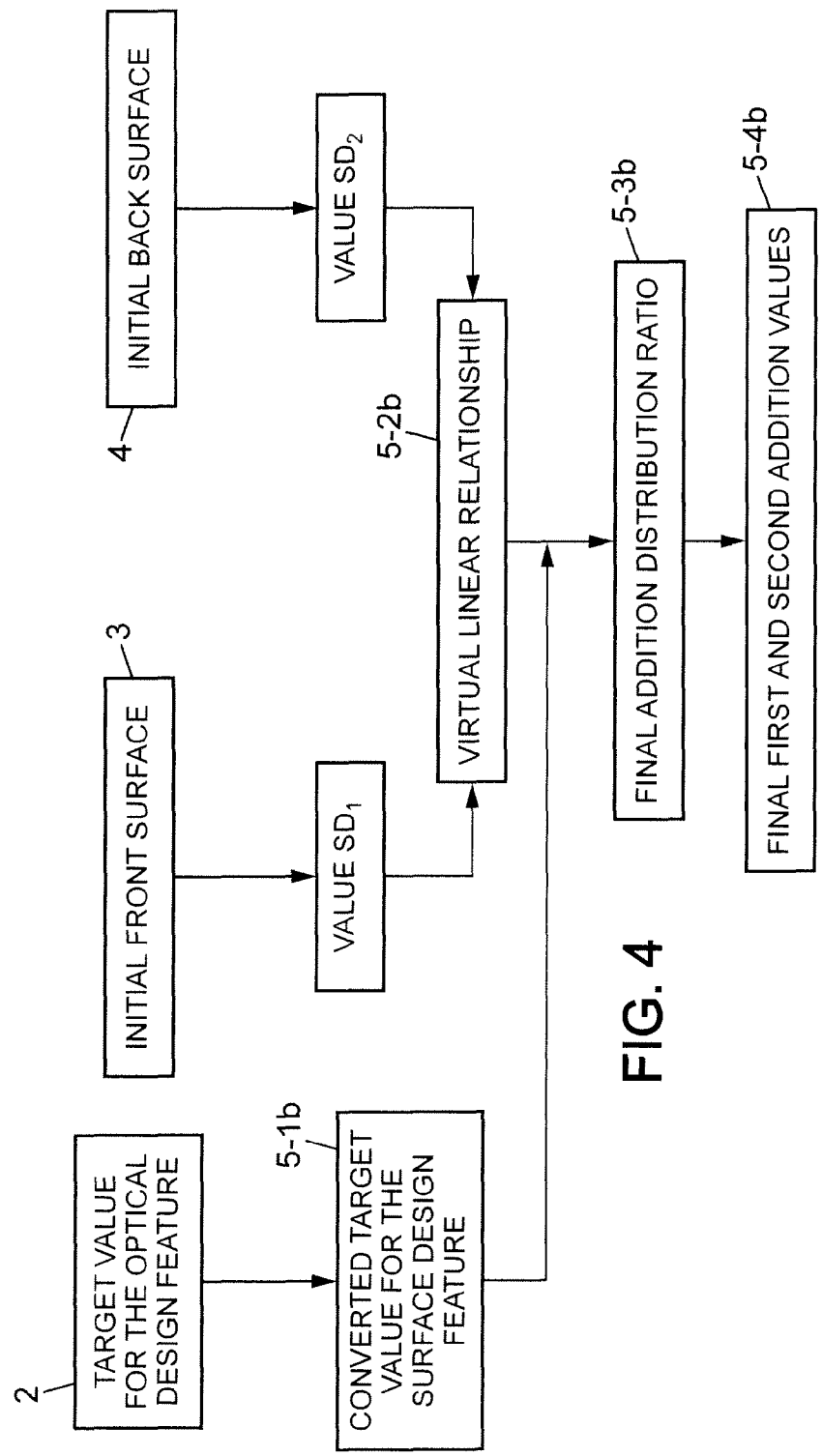

FIG. 4 illustrates these substeps using their respective labels as reference signs.

The virtual linear relationship determined in substep /5-2b/ and implemented in substep /5-3b/ may be:

$SD_1 - SD_2$ $Radd_{final[} = -\hat{(3)}^{final]} SD_2 - SD_1$ where $SD_{target}$ is the converted target value for the surface design feature, and SDi, resp. SD2, is the first and second values of the surface design feature for the initial front surface 3 and the initial back surface 4. Then, the final first and second addition values may be calculated using formulae (2) again.

Step 6 in FIG. 2 is the machining of the eyeglass 100 in accordance with the final front surface 3b and the final back surface 4b. It may be performed using a known digital machining process.

Figure 5C:
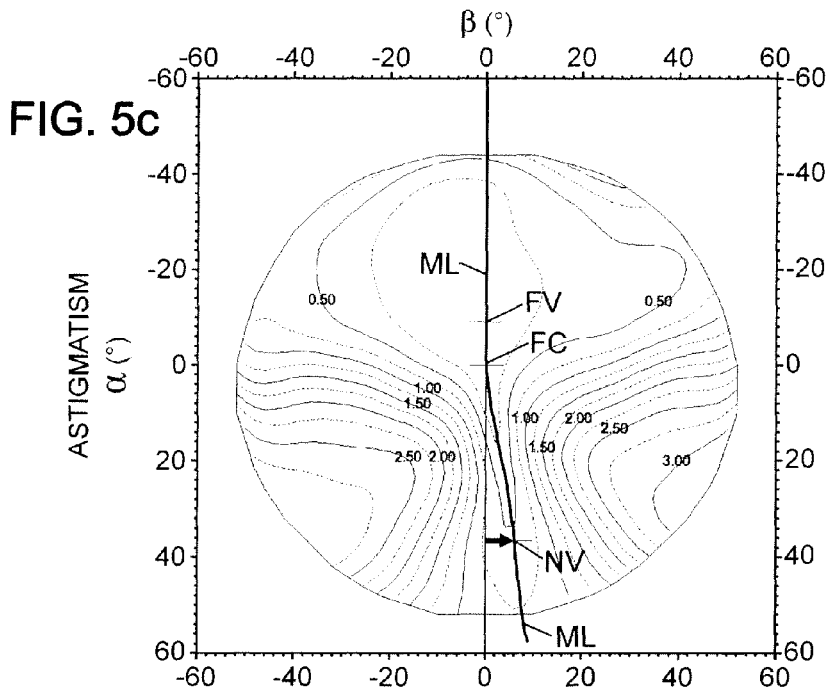
FIG. 5c is the corresponding astigmatism map of a final eyeglass designed for obtaining a first target inset value.

FIGS. 5a to 5c illustrate a first implementation of the invention for producing a desired value of the inset i for a wearer with a prescribed addition equals to 2.50 diopters. FIG. 5a is a cylinder map drawn for the final front surface 3b, with final first addition value equal to 1.25 diopters and first inset value equal to zero. FIG. 5b is another cylinder map for the final back surface 4b, with final second addition value equal to −1.25 diopters and second inset value equal to 5 mm (millimeter). The target value for the eyeglass inset i is 5° (degree), which corresponds to a converted target value of 2.5 mm along the x-axis. So formula (3) leads to $Radd f_{na}i = 0.50$. If the prescribed addition value Apresc is 2.50 diopters, then both final front and back surfaces are to be provided with 1.25 diopter addition and −1.25 diopter addition respectively, in accordance with FIGS. 5a and 5b. FIG. 5c is then the astigmatism map of the final eyeglass thus designed with inset value of about 5°.

Figure 5D:
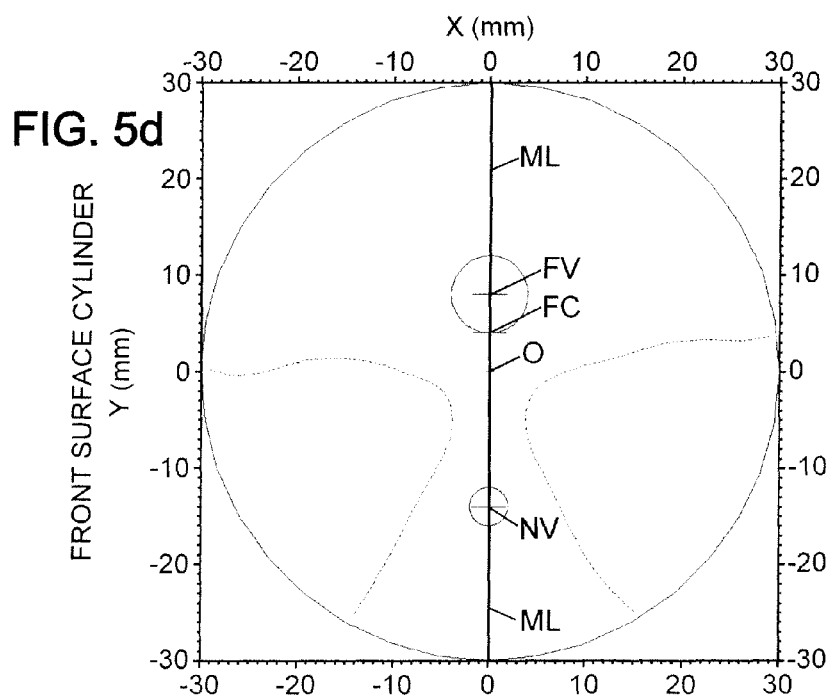
FIGS. 5d to 5f correspond respectively to FIGS. 5a to 5c for obtaining a second target inset value.
Figure 5E:
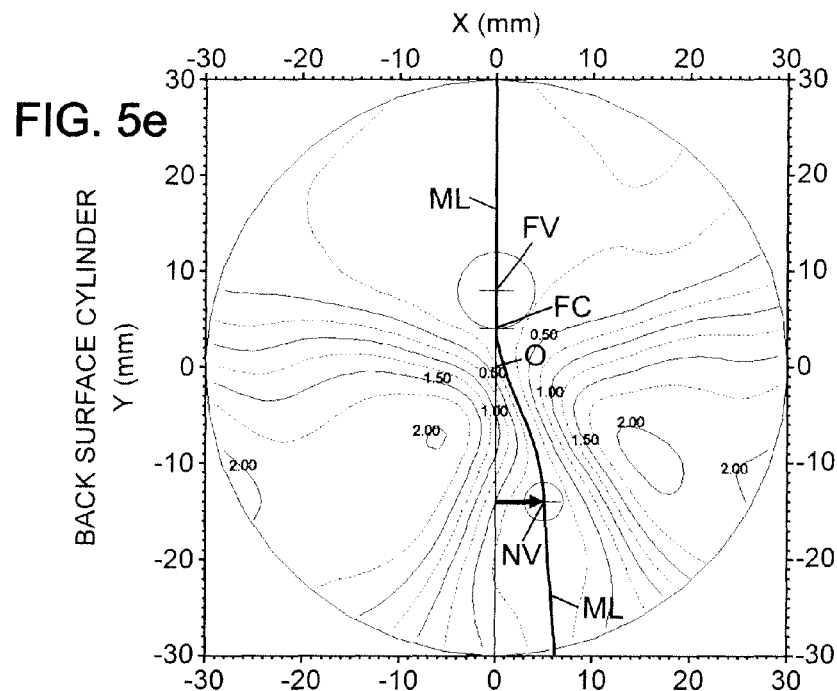
Figure 5F:
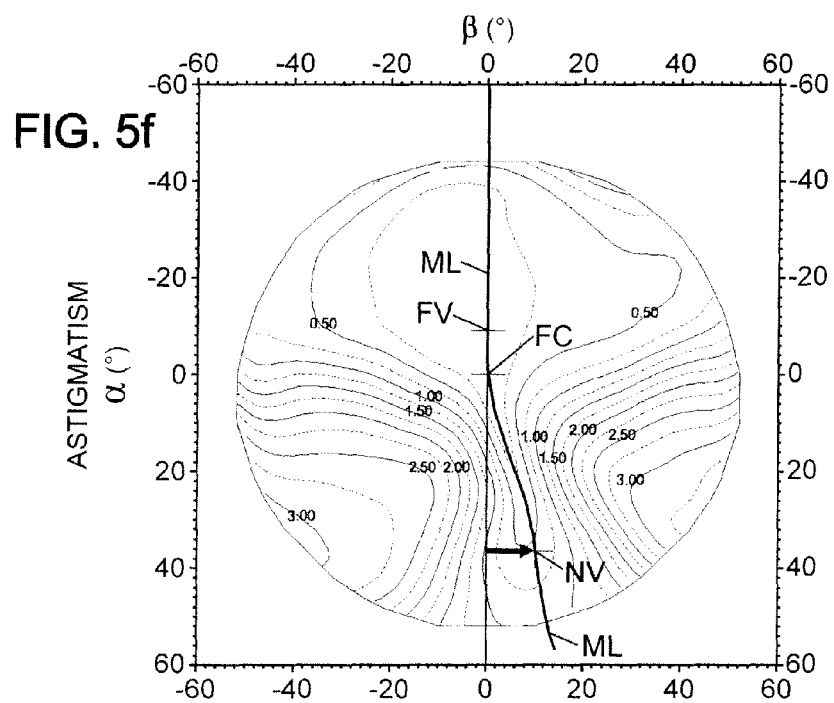

FIGS. 5d to 5f illustrate a second example of inset selection. The prescribed addition value is again 2.50 diopters and the target inset value is now 8.2°, corresponding to 4.1 mm along the x-axis. Starting again with an initial front surface 3a with zero inset and an initial back surface 4a with 5 mm inset value, the addition distribution ratio is now $Radd f j_{na}i = 0.18$, corresponding to final first and second addition values respectively equal to 0.45 diopter and −2.05 diopters. Then FIG. 5d is the cylinder map of the final front surface 3b, which is derived from FIG. 5a using the surface derivation tool for providing the 0.45 diopter first addition value. FIG. 5e is the cylinder map of the final back surface 4b, which is derived from FIG. 5b by providing a −2.05 diopter second addition value. FIG. 5f is the astigmatism map of the resulting eyeglass with inset value of about 8.2°.

Figure 6C:
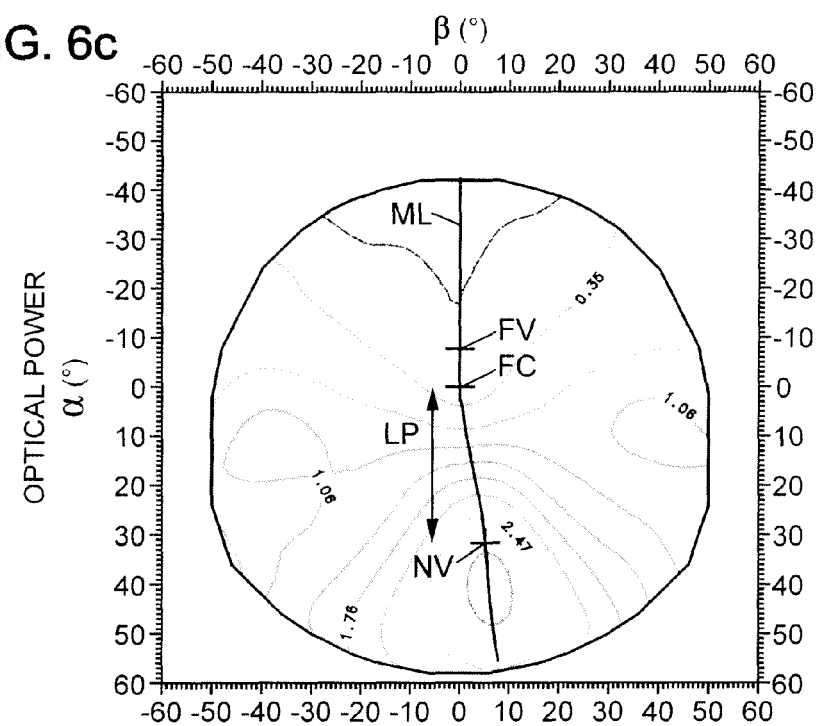
FIG. 6c is the optical power map of a final eyeglass designed for obtaining a first target progression length.

FIGS. 6a to 6c illustrate a second implementation of the invention for selecting a value of the progression length p. The first progression length of the initial front surface 3a is 14 mm, the second progression length of the initial back surface 4a is 18 mm, and the target value for the eyeglass progression length is 32°, which corresponds to a converted target value of 16 mm. Then formula (3) leads to $Radd f j_{na}i = 0.50$. So both front and back surfaces are to be provided with the same final addition value. If the prescribed addition value is 2.50 diopters, then the final first and second addition values are again 1.25 diopters and −1.25 diopters respectively. FIGS. 6a and 6b are sphere maps for the final front surface 3b and the final back surface 4b, respectively, and FIG. 6c is the optical power map of the final eyeglass thus designed.

Figure 6D:
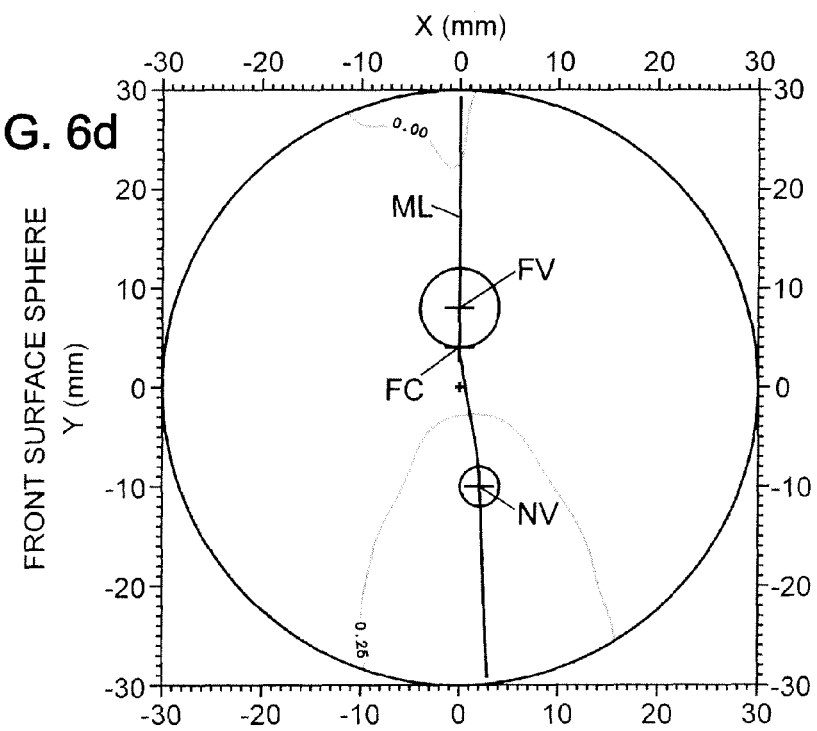
FIGS. 6d to 6f respectively correspond to FIGS. 6a to 6c for obtaining a second target progression length.
Figure 6E:
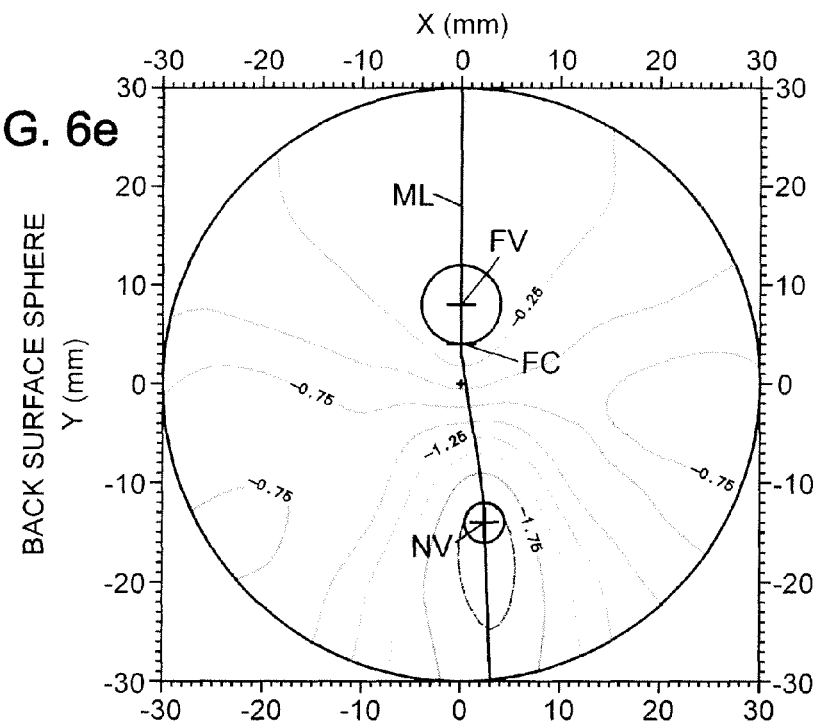
Figure 6F:
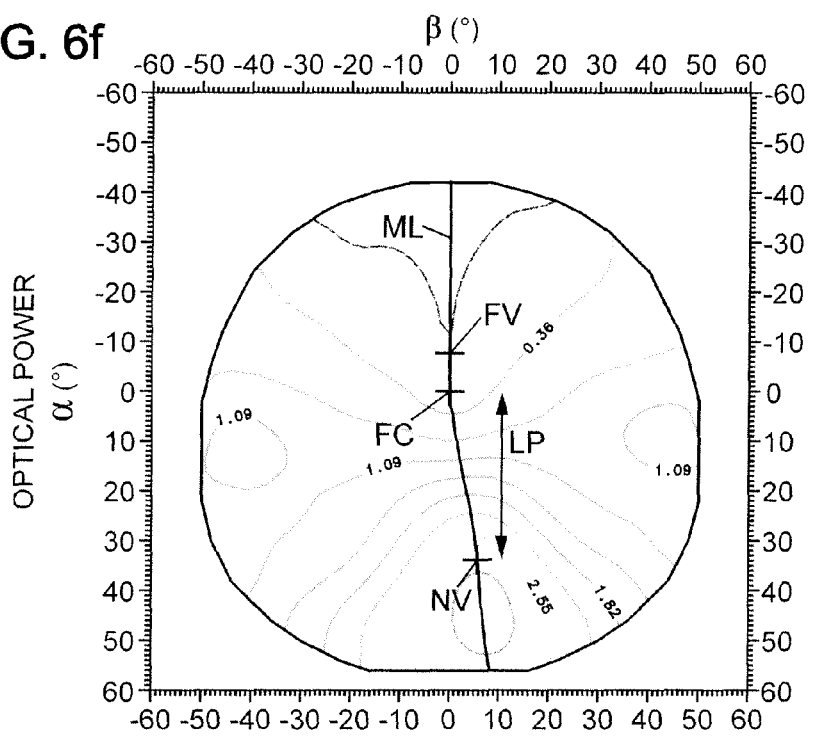

Suppose that the target value for the eyeglass progression length p is now 34.6°, and the prescribed addition value is again 2.50 diopters. This target value for the progression length corresponds to a converted target value of 17.3 mm. Then formula (3) leads to $Radd fmai = 0.18$. So the final front surface 3b is to be provided with the final first addition value of 0.45 diopter (FIG. 6d), and the final back surface 4b is to be provided with the final second addition value of −2.05 diopters (FIG. 6e). The final eyeglass optical power is displayed in FIG. 6f.

The third implementation of the invention relates to adjusting the width of the vision fields based on the value of a coefficient describing the respective movements of the eyes and the head of the wearer. These movements are measured on the wearer in a manner known per se, when the wearer is asked to change his sight direction. FIGS. 7a to 7d are cylinder maps drawn for four front surfaces which are derived from one another. Their respective first addition values are 0.75 diopter (FIG. 7a), 1.25 diopters (FIG. 7b), 1.75 diopters (FIG. 7c) and 2.50 diopters (FIG. 7d). These front surfaces are of hard design type, with large far vision field, high gradients on either side and high values of maximum unwanted cylinder. Similarly, FIGS. 7e to 7h are cylinder maps drawn for four back surfaces which are also derived from one another. Their respective second addition values are −0.75 diopter (FIG. 7e), −1.25 diopters (FIG. 7f), −1.75 diopters (FIG. 7g) and −2.50 diopters (FIG. 7h). These back surfaces are of soft design type, with low gradients on either side and low levels of unwanted maximum cylinder. FIGS. 7i to 7m are then astigmatism maps of five final eyeglasses all corresponding to the prescribed addition value of 2.50 diopters. Table 1 below indicates the respective front and back surfaces of these eyeglasses, with the corresponding surface addition values in diopters:

TABLE 1

Figure 7A:
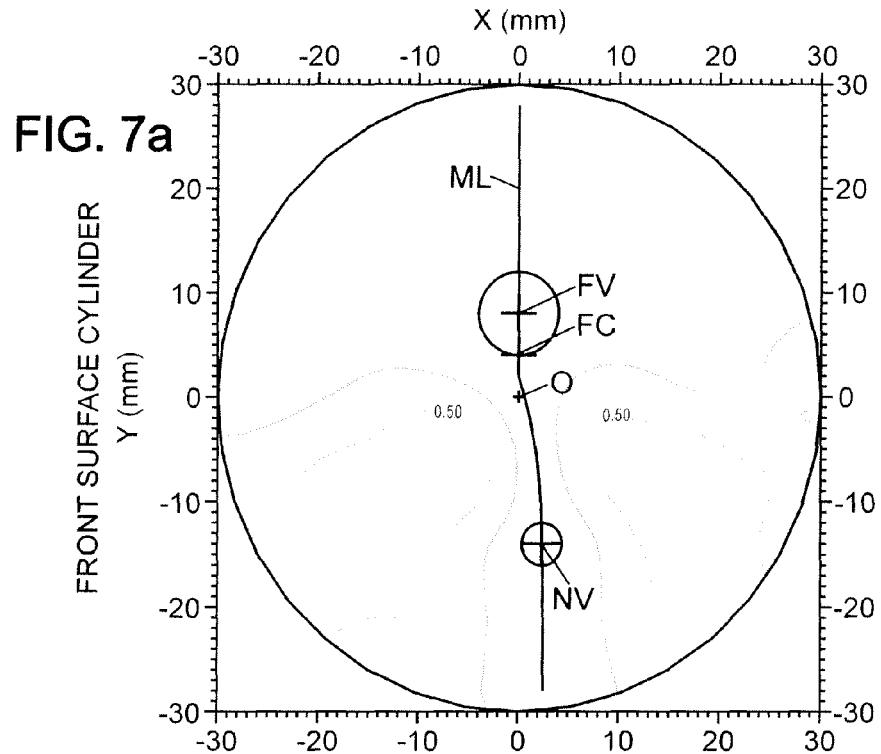
FIGS. 7a to 7d are respective cylinder maps of four initial eyeglass front surfaces.
Figure 7B:
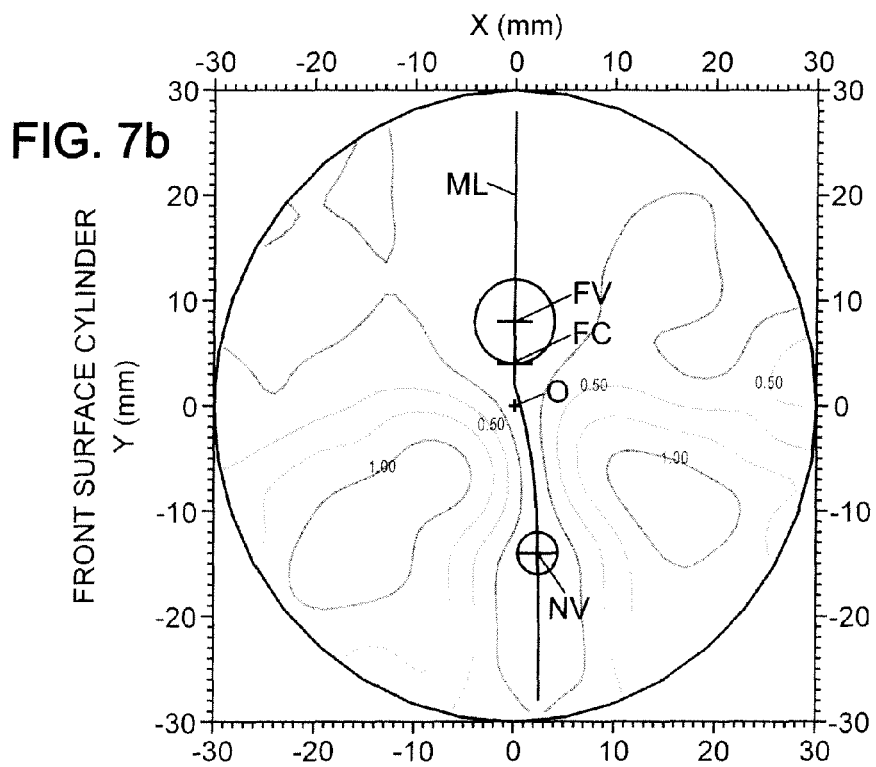
Figure 7C:
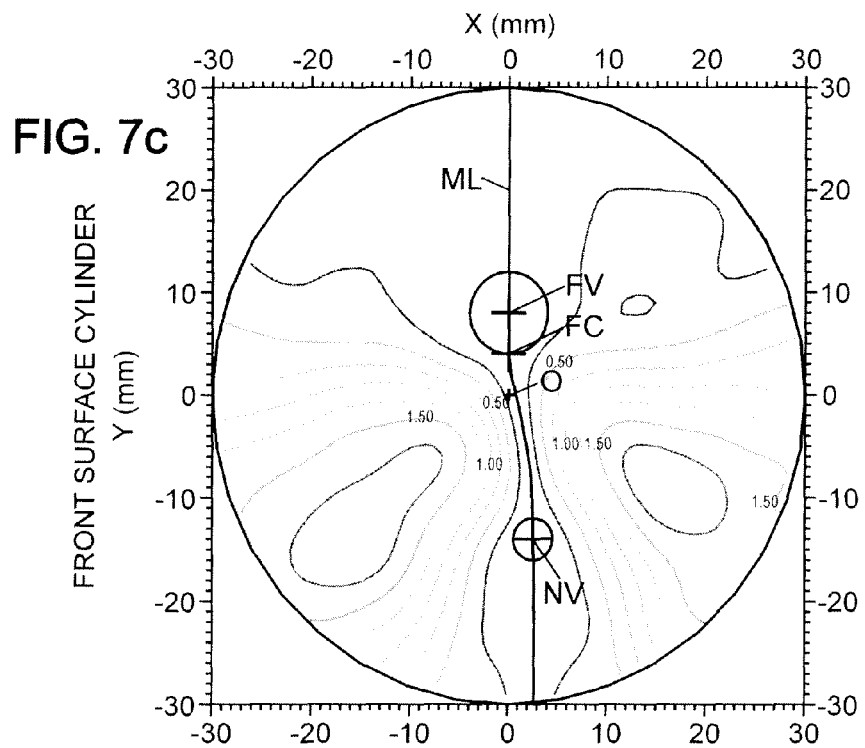
Figure 7D:
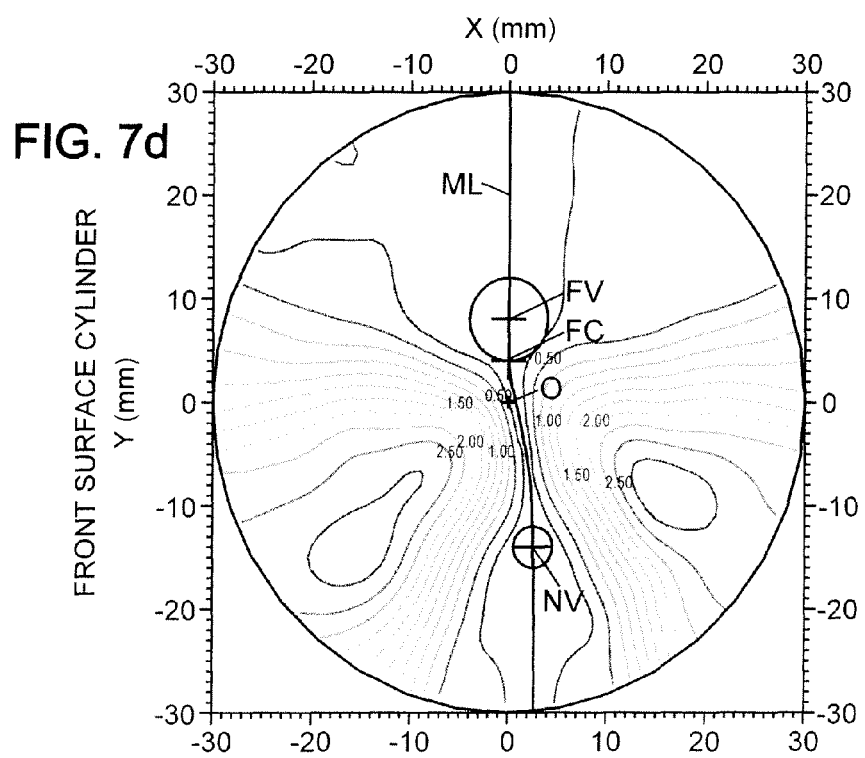
Figure 7E:
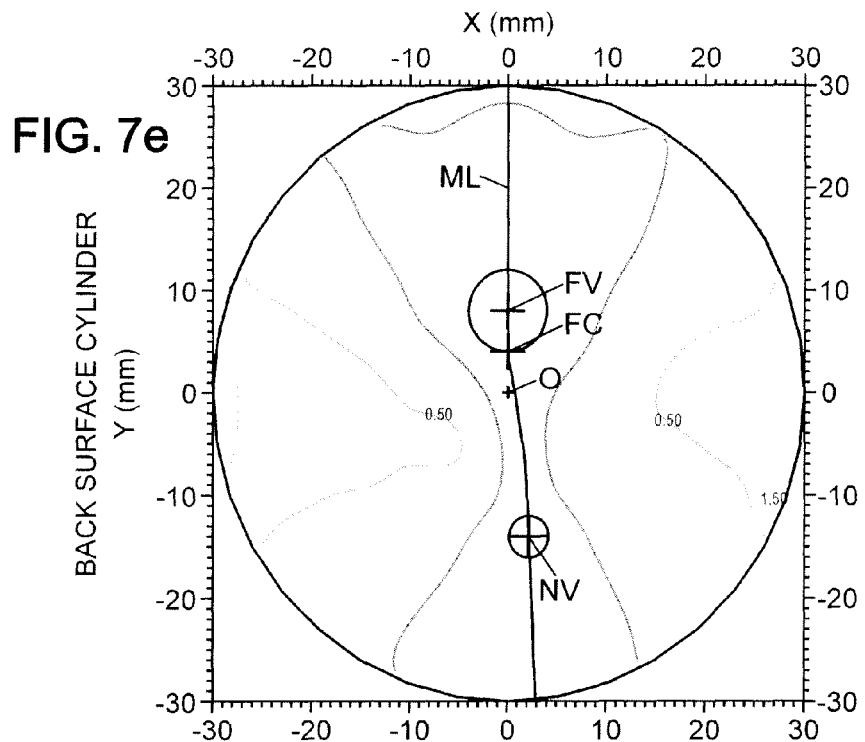
FIGS. 7e to 7h are respective cylinder maps of four initial eyeglass back surfaces.
Figure 7F:
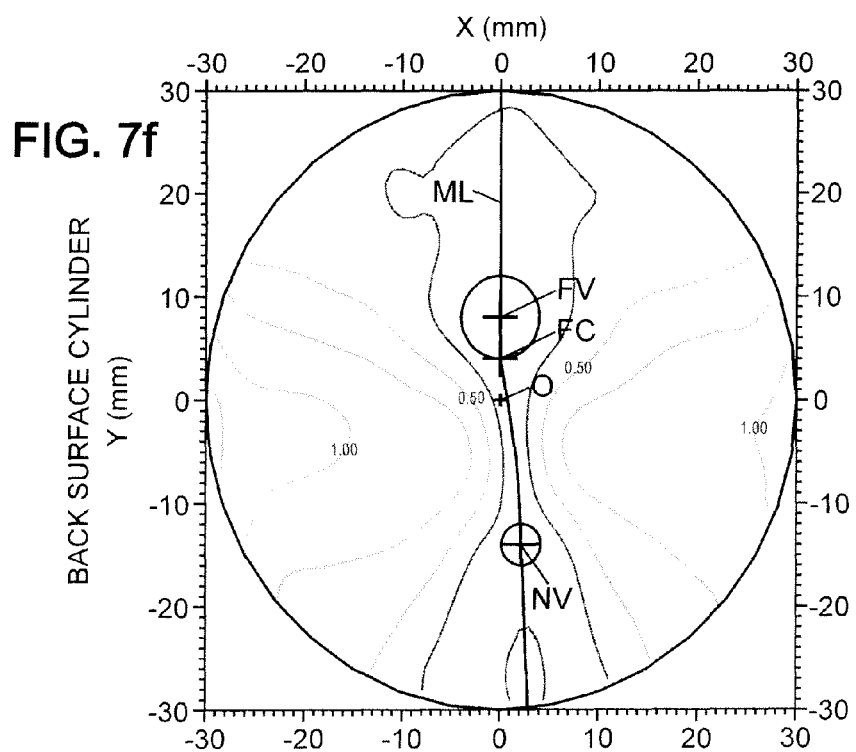
Figure 7G:
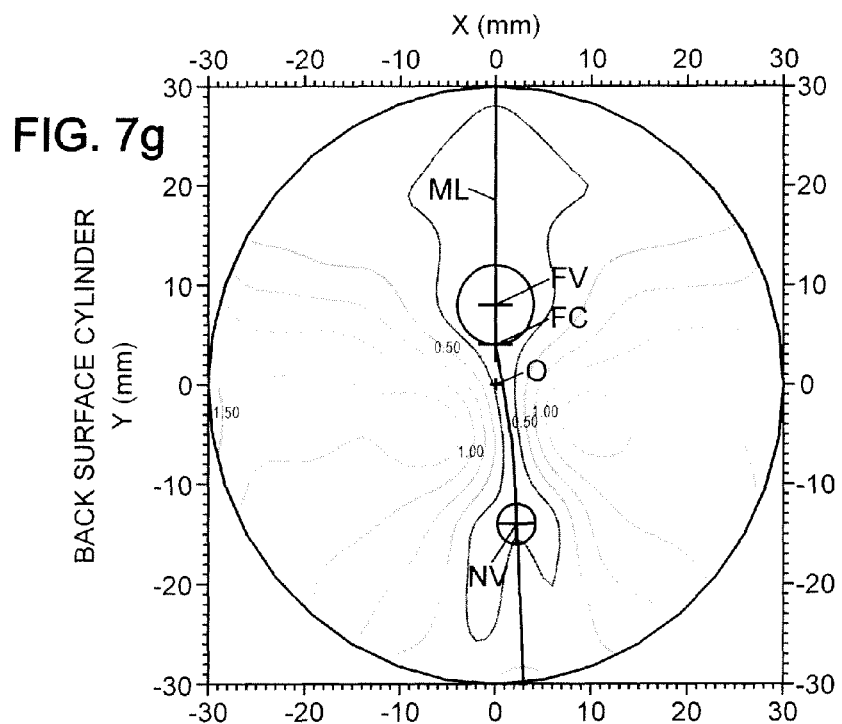
Figure 7H:
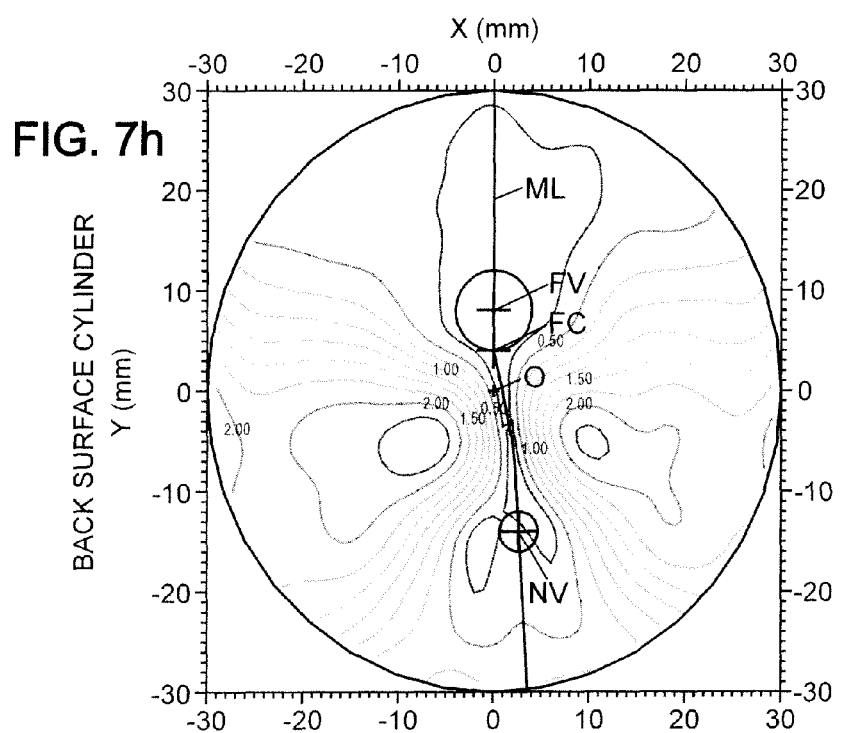
Figure 7I:
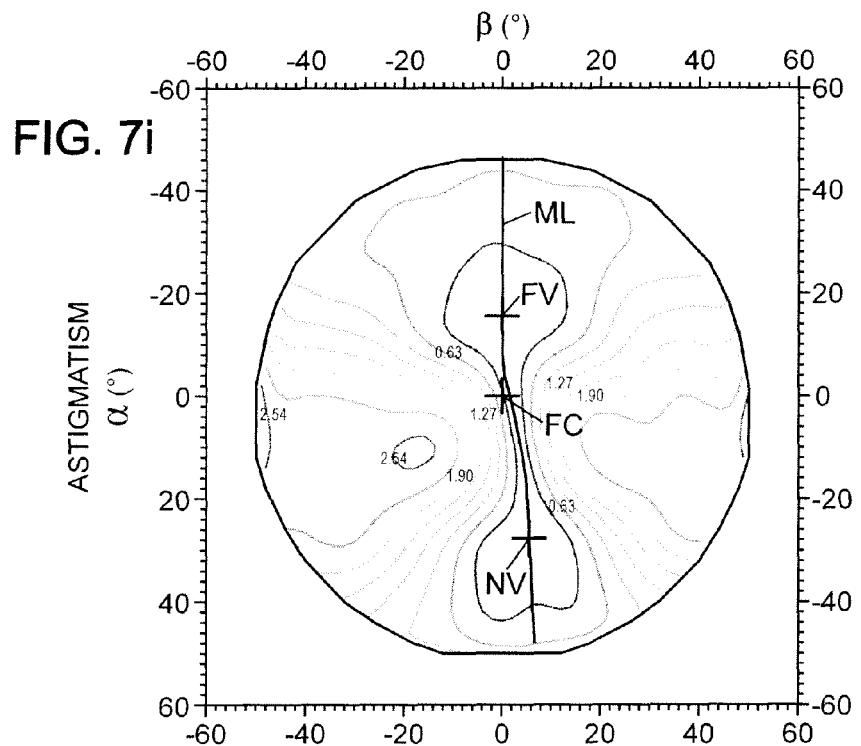
FIGS. 7i to 7m are respective astigmatism maps of five final eyeglasses designed according to the invention with progressively varying design balance of the eyeglasses.
Figure 7J:
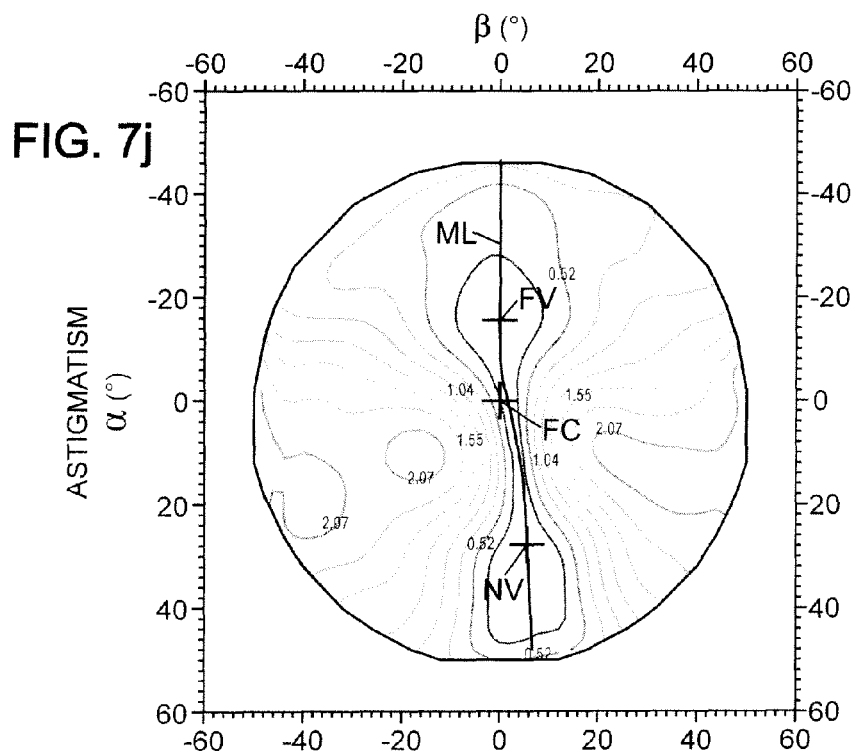
Figure 7K:
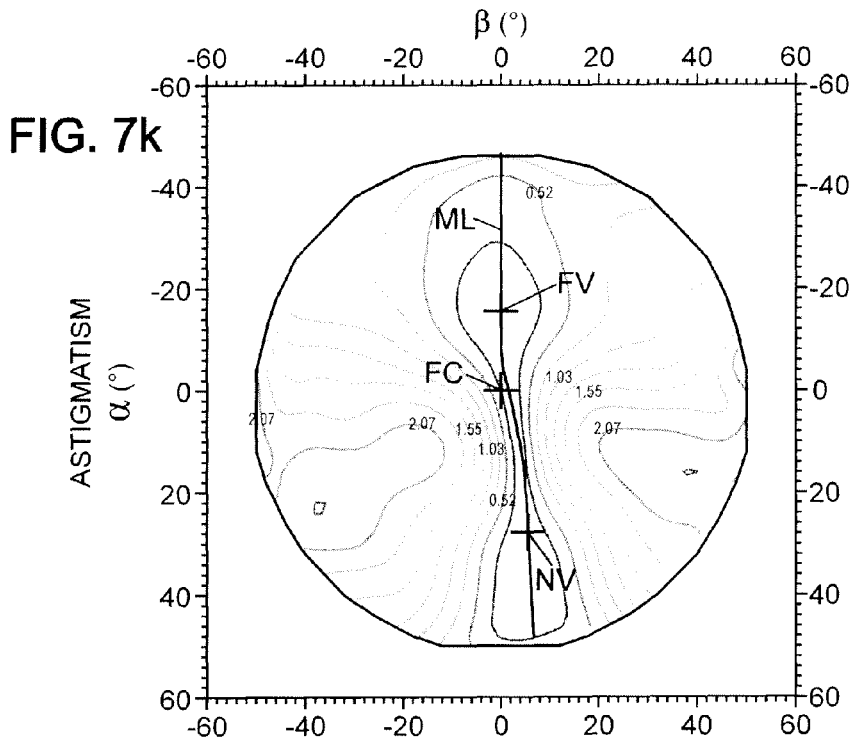
Figure 7L:
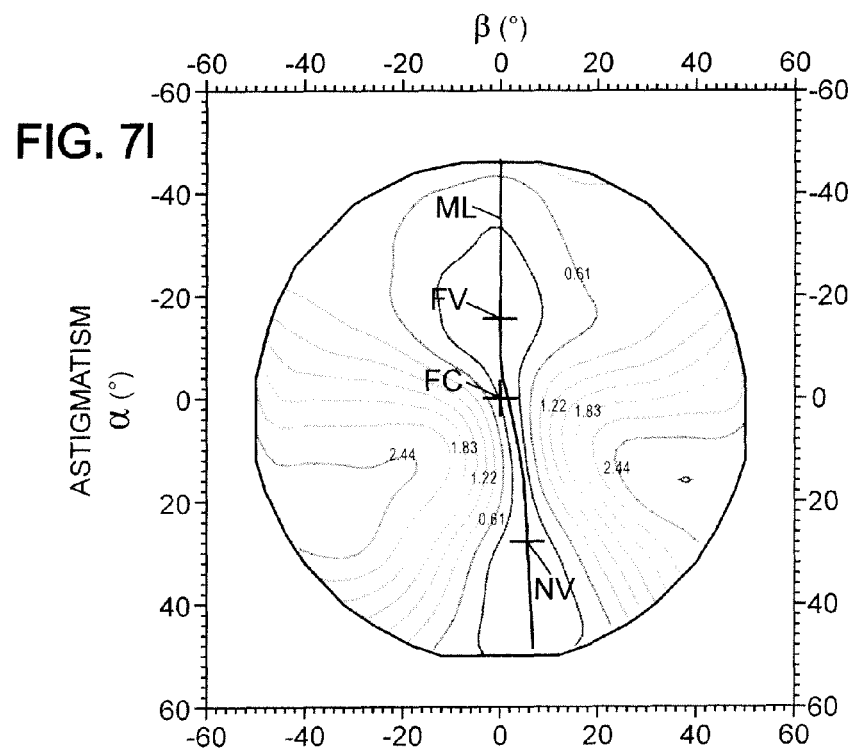
Figure 7M:
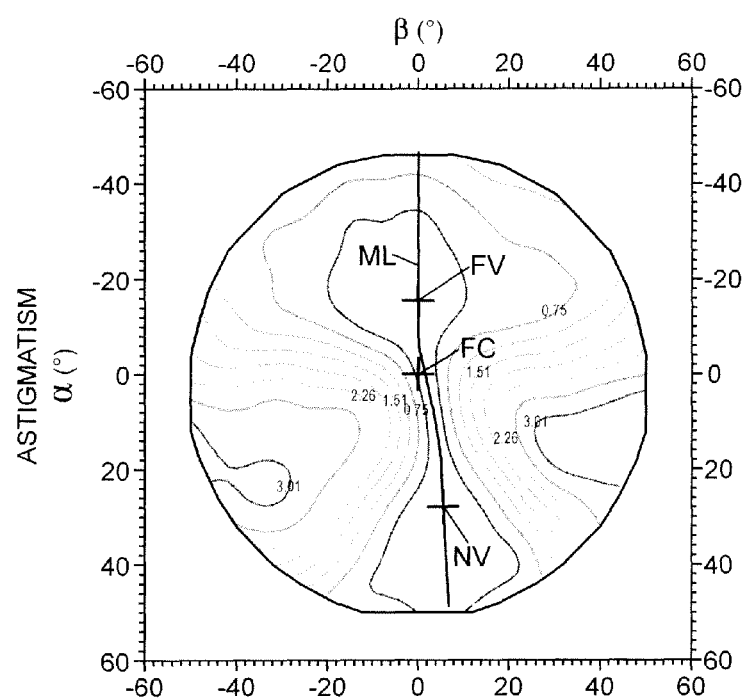

| Final eyeglass | FIG. 7i | FIG. 7j | FIG. 7k | FIG. 7l | FIG. 7m |
|---|---|---|---|---|---|
| Front surface | — | FIG. 7a | FIG. 7b | FIG. 7c | FIG. 7d |
| Back surface | FIG. 7h | FIG. 7g | FIG. 7f | FIG. 7e | — |
| Final first addition value | 0 | 0.75 | 1.25 | 1.75 | 2.50 |
| Final second addition value | −2.50 | −1.75 | −1.25 | −0.75 | 0 |

When comparing FIGS. 7i to 7m, one can observe that the hard design character of the final eyeglasses is progressively increasing. Therefore, these eyeglasses may be assigned to wearers with increasing magnitudes of eye movements.

Generally, the optical design feature which is used in the invention may be more complex than a simple feature quantified with a single value, such as the inset i, the progression length p, a canal width, etc. . . . It may consist in a trade-off between several features, which trade-off is determined according to the invention by the respective values of the addition of the final front and back surfaces.

The invention claimed is:

1. A process for designing an ophthalmic progressive eyeglass, comprising the following Steps:

Step-1 providing an ophthalmic prescription for a wearer of the eyeglass, comprising prescribed values respectively of a far vision optical power, an astigmatism correction and an addition;

Step-2 providing a target value for at least one optical design feature of the eyeglass to be manufactured;

Step-3 providing at least one initial eyeglass front surface, with an initial first addition value and a first value for a surface design feature connected to said optical design feature;

Step-4 providing at least one initial eyeglass back surface, with an initial second addition value and a second value for the surface design feature, the first and second values of said surface design feature being different from one another when said initial front and back surfaces are provided with one and same addition value by surface derivation;

Step-5 computer-simulating the eyeglass using:

a final front surface derived from the initial front surface for changing the initial first addition value into a final first addition value for said final front surface;

a final back surface derived from the initial back surface for changing the initial second addition value into a final second addition value for said final back surface; and a transparent medium intermediate between the final front and back surfaces;

at least one of the final front and back surfaces being further combined with a spherical or toric surface so that the computer-simulated eyeglass exhibits the prescribed values of the far vision optical power and the astigmatism correction, and the final first and second addition values being selected so that the eyeglass exhibits substantially the prescribed addition value and the target value for said optical design feature.

2. The process according to claim 1, wherein the final first and second addition values are selected by using an optimization process, consisting in adjusting said final first and second addition values used as optimization parameters, so that the eyeglass exhibits substantially the prescribed addition value and the target value for said optical design feature.

3. The process according to claim 1, wherein the final first and second addition values are selected by performing the following Substeps:

Substep 5-1a computer-simulating a first reference eyeglass using:
   a first front surface derived from the initial front surface by changing the initial first addition value into the prescribed addition value;
   a first back surface derived from the initial back surface by changing the initial second addition value into zero addition value; and
   the transparent medium intermediate between the first front and back surfaces, Substep 5-2a combining at least one of the first front surface and first back surface with a spherical or toric surface so that the computer-simulated first reference eyeglass exhibits the prescribed values of the far vision optical power and the astigmatism correction, and calculating a first reference value of the optical design feature for the first reference eyeglass;

Substep 5-3a computer-simulating a second reference eyeglass using:
   a second front surface derived from the initial front surface by changing the initial first addition value into zero addition value;
   a second back surface derived from the initial back surface by changing the initial second addition value into the opposite of the prescribed addition value; and
   the transparent medium intermediate between the second front and back surfaces;

Substep 5-4a combining at least one of the second front surface and second back surface with a spherical or toric surface so that the computer-simulated second reference eyeglass exhibits the prescribed values of the far vision optical power and the astigmatism correction, and calculating a second reference value of the optical design feature for the second reference eyeglass;

Substep 5-5a based on the first and second reference eyeglasses, determining a virtual linear relationship for variations of the optical design feature as a function of a distribution ratio of a total addition value of the front and back surfaces;

Substep 5-6a calculating the distribution ratio of the prescribed addition value between the final front and back surfaces by inputting the target value into the virtual linear relation of Substep 5-5a; and Substep 5-7a calculating the final first and second addition values from the distribution ratio obtained in Substep 5-6a and the prescribed addition value.

4. The process according to claim 1, wherein the final first and second addition values are selected by performing the following Substeps:

Substep 5-1b converting the target value for the optical design feature into a converted target value for the surface design feature;

Substep 5-2b based on the initial front and back surfaces, determining a virtual linear relationship for variations of the surface design feature as a function of a distribution ratio of a total addition value of the front and back surfaces;

Substep 5-3b calculating the distribution ratio of the prescribed addition value between the final front and back surfaces by inputting the converted target value into the virtual linear relation of Substep 5-2b; and Substep 5-4b calculating the final first and second addition values from the distribution ratio obtained in Substep 5-3b and the prescribed addition value.

5. The process according to claim 1, wherein the initial eyeglass front and back surfaces are read from data files stored on a computer-readable medium.

6. The process according to claim 1, wherein either the final front surface is derived from the initial front surface by further changing an initial first base curve value of said initial front surface into a final first base curve value for said final front surface,
   or the final back surface is derived from the initial back surface by further changing an initial second base curve value of said initial back surface into a final second base curve value for said final back surface,
   or both.

7. The process according to claim 1, further comprising the following Step:

Step 6 machining the eyeglass in accordance with the eyeglass computer-simulated in Step 5.

8. The process according to claim 7, wherein at least one of the final first and second addition values are selected so that the corresponding final front surface or back surface pertains to a semi-finished eyeglass available.

9. The process according to claim 1, wherein the optical design feature is selected among a lateral offset of a near vision direction of the eyeglass with respect to a far vision direction, a width of a near vision field of the eyeglass, a width of a far vision field of the eyeglass, a width of an intermediate vision field of the eyeglass, said field widths being expressed in terms of optical power variations, astigmatism variations or unwanted astigmatism variations for fixed vision height, a total progression length of the eyeglass, a partial progression length of the eyeglass defined by a fixed proportion of optical power increase to the prescribed addition value, an optical power value for fixed vision direction, a value for astigmatism or unwanted astigmatism value for fixed vision direction, an optical power gradient value for fixed vision direction, a gradient value for astigmatism or unwanted astigmatism for fixed vision direction, said gradient values possibly referring to points pertaining to a meridian line of the eyeglass, a maximum value for unwanted astigmatism over the whole eyeglass or over an eyeglass part limited to one side of a meridian line of the eyeglass, a maximum gradient value for optical power or astigmatism or unwanted astigmatism over the whole eyeglass or over an eyeglass part limited to one side of the meridian line of the eyeglass, a maximum gradient value for optical power along the meridian line of the eyeglass, or a combination of two or more of the previous features.

10. The process according to claim 1, wherein the target value for the optical design feature is determined by a measurement performed on the eyeglass wearer.

* * * * *